Patented Apr. 16, 1929.

1,709,636

UNITED STATES PATENT OFFICE.

WALTER O. SNELLING, OF ALLENTOWN, PENNSYLVANIA, ASSIGNOR TO TROJAN POWDER COMPANY, OF NEW YORK, N. Y., A CORPORATION OF NEW YORK.

EXPLOSIVE FOR SIGNALING.

No Drawing. Original application filed March 16, 1921, Serial No. 452,734. Divided and this application filed December 11, 1924. Serial No. 755,320.

My invention has to do with the dissemination through the air, by means of explosives, of explosively inert materials such, for example, as toxic materials used in recent chemical warfare or dyes or coloring substances adapted by dispersion in the air to give signals readily visible at great distances. One object of the invention is to bring about the desired dissemination in a more efficient manner than heretofore practiced, as well as to increase the extent and fineness of the dissemination. Another object is to reduce the tendency of the toxic or other inert material to decompose at the moment of explosion. Further objects and advantages of the invention will appear from the following description.

Hand grenades and shells containing various materials intended to be spread and widely disseminated through the atmosphere at the moment of explosion of the shell or other container, have met with considerable use in warfare in recent years. In general, such devices have consisted of a central explosive charge suitably adapted to be detonated at the proper time, and an outer envelope of the material which it was desired to disseminate through the air. This material may be a liquid toxic substance, as for example, diphosgene; a solid toxic substance, as diphenylcyanarsine; a liquid lachrymator, as brombenzylcyanide; a liquid vesicant, as dichlorethylsulfide; (mustard gas); or such non-toxic materials as dyes, intended by dispersion in the air to give signals readily visible at great distances.

I have discovered that nitrated starch, existing in the form of nitrated starch granules, by simple admixture with toxic, colored, lachrymatory, vesicant, or other materials, gives an explosive filling charge which possesses many points of advantage over the formerly used toxic and signaling shells and other like devices. Starch before nitration exists in the form of very minute granules, differing somewhat in size according to the botanical source of the starch, but in all cases only a few hundredths of a millimeter in diameter at the largest. On being nitrated the size of the granules does not noticeably increase, and well nitrated starch consists of a fine powder of which the size of the average particle is less than two-one-hundredths of a millimeter in diameter. By directly mixing nitrostarch granules with a non-explosive material which it is desired to disseminate through the atmosphere in finely divided particles, I obtain a composition or mixture which on detonation is far more efficient than such devices as have been used up to the present time, the relation between the detonating agent and the material to be disseminated or "atomized" being in the prior devices far less direct than in mixtures made according to my present invention.

The close association of the liquid or solid body which it is desired to disseminate at the instant of explosion with the minute particles of nitrated starch, together with the intense rending effect which nitrostarch produces at the instant of detonation, reduces the admixed body to particles of extreme fineness, and projects those particles with great force to a considerable distance from the center of the explosion, thus producing the desired dissemination of the admixed body to a much greater extent than has ever been possible by previously known means.

As an illustration of my invention, I will recite the preparation of a composition which I find particularly suited for use as a filling charge in toxic shell. I first thoroughly incorporate 79 parts by weight of nitrostarch in the form of well nitrated nitrostarch granules of 13.00% nitrogen, and one-half part of a heavy lubricating oil. After the thorough mixing of these two ingredients I add 20½ parts of finely powdered diphenylcyanarsine, which is then thoroughly incorporated with the mixture of nitrostarch and oil. The finished mixture is ready for use as a filling charge for grenades.

In general, I prefer to use from 40 to 80 parts by weight nitrated starch and from 10 to 40 parts of the material to be disseminated or "atomized", the remainder of the composition comprising customary stabilizing anti-acid, oxidizing or consistency-giving materials.

In some cases, as for example where the mixture is to be used in charging aerial drop-bombs, decreased sensitiveness of the explosive may be desirable, and this may be secured where the material to be desseminated is a liquid by increasing somewhat the percentage of said material in the mixture. For example, if the illustrative composition above mentioned be modified by using thirty parts of diphenylcyanarsine, sixty-nine and one-fourth parts of nitrated starch, and three-fourths parts of oil, I obtain a composition of less sensitiveness than that of the first example given. This adaptability of nitrostarch explosives to sensitiveness control is a valuable characteristic of the material for the purpose in view.

Many of the toxic materials which are used in gas shells, as well as coloring materials used with explosives for colored cloud effects in signaling, are organic bodies liable to decomposition to a greater or less extent by the intense heat to which these materials are exposed at the moment of detonation of the explosive, and a considerable portion of the active toxic or coloring agent may be lost through such detonation. With nitrostarch as the detonating agent, I can control and lessen this decomposition. Nitrostarch may be employed wet, that is, mixed with water, thereby securing a relatively low flame temperature upon explosion and greatly reducing the decomposing effect upon the admixed toxic or other agent, and I have further discovered that by soaking nitrostarch in a solution of common salt, or a solution of any of the materials commonly recognized as possessing flame-cooling properties, for example, oxanilid or dinitrooxanilid, I obtain granules which have substantially the same explosive force as the untreated granules of nitrostarch, but which, by producing a lower flame temperature upon explosion, have even less tendency to decompose the admixed materials than does wet nitrostarch. In carrying out this step the nitrated starch in either wet or dry condition may be stored for some time, say one-half hour to one hour, with a concentrated solution of the flame temperature reducing agent. With most agents the solution should be saturated. After being kept in contact with the solution for the time mentioned, the agent is removed, allowed to drain and then dried at a low temperature. The excess liquid can be removed in a centrifugal at moderate speed, but excessive removal should of course not occur, as it is desirable to retain a maximum of the flame reducing agent with the nitrostarch, after the evaporation of the solvent.

Instead of employing these agents in the form of a solution absorbed by the nitrostarch, I may mix them in solid form with the nitrostarch and obtain similar results. In this case the amount of the flame reducing agent used may be from 5% to 50% of the nitrostarch. Where a very efficient flame reducing agent such as oxanilid is used, the amount may be even less than 5% but in ordinary practice I prefer to use a flame deadening agent to the extent of approximately 30% or 40% of the weight of the nitrostarch in the explosive composition.

As a representative example of a composition containing an admixed pulverulent flame-reducing composition I will give the following:

| | Per cent. |
|---|---|
| Nitrostarch | 65.0 |
| Diphenylcyanarsine | 14.5 |
| Sodium chloride | 20.0 |
| Hydrocarbon oil | .5 |
| | 100.0 |

If a more efficient flame-deadening agent were used in place of sodium chloride, the amount of the flame-deadening agent could be reduced, and the amount of the toxic agent could be correspondingly increased, the following representing an example of a composition containing oxanilid:

| | Per cent. |
|---|---|
| Nitrostarch | 60.0 |
| Diphenylcyanarsine | 27.5 |
| Oxanilid | 12.0 |
| Hydrocarbon oil | .5 |
| | 100.0 |

Where a solid agent to be disseminated from the shell is extremely sensitive to decomposition by the heat, the material may be advantageously dissolved in a liquid and the nitrostarch then mixed with this solution. At the instant of explosion the liquid is disseminated as a spray in highly-attenuated or atomized condition, and its evaporation leaves the particles of the dissolved solid in suspension in such a finely divided condition as to be particularly effective while at the same time the evaporation of the liquid at the instant of explosion prevents a high temperature being reached, the heat of vaporization of the liquid absorbing a considerable portion of the energy which would otherwise produce an excessive flame temperature. Carbon tetrachloride forms a desirable solvent for use in this method of procedure, the shell composition comprising from 70% to 90% of nitrostarch, and from 10% to 30% of a saturated solution of the toxic agent in carbon tetrachloride.

With compositions including toxic agents to be disseminated, I may employ in lieu of a flame-cooling agent, a material which will itself decompose into toxic products and add to the toxic effect of the entire composition upon detonation. Such an agent, for example, is ethane hexachloride, which, if added to a mixture of nitrostarch and a toxic agent, will, upon detonating of the nitrostarch, be decomposed and yield free chlorine gas and other highly toxic products, while absorbing a part of the heat of explosion, and render the main toxic agent less liable to undesirable decomposition. Similar results can be obtained with other chlorinated bodies, such, for example, as carbon tetrachloride, ethylene trichloride or ethylene tetrachloride, materials producing upon decomposition such poisonous products as free chlorine and carbonyl dichloride or phosgene, largely used for offensive purposes in recent chemical warfare.

In some cases I may rely upon the decomposition products of the chlorinate bodies as the sole toxic agent to be disseminated by the nitrostarch explosive. For example, a simple mixture of nitrated starch, an oxidizing agent, such as sodium nitrate and a chlorinated body, such as hexachlorethane or carbon tetrachloride may be employed. In this case, no toxic material is present in the shell before explosion, but upon detonation of the nitrostarch, the poisonous decomposition products are produced and disseminated through the atmosphere as required. In this case of course reduction of flame temperature is not secured or desired, the object being to obtain as complete decomposition of the explosively inert ingredient as possible. An example of such a mixture is:

| | Per cent. |
|---|---|
| Nitrostarch (containing 10% of water) | 75 |
| Hexachlorethane | 20 |
| Sodium nitrate | 5 |
| | 100 |

I claim:

1. The method of signaling, which comprises detonating a composition of nitrated starch and a non-explosive signaling material.

2. An explosive composition comprising nitrated starch and a non-explosive signaling material.

3. An explosive composition comprising granules of nitrostarch, an admixed non-explosive coloring substance, and a flame cooling material.

4. An explosive composition comprising granules of nitrostarch, admixed particles of a non-explosive signaling material capable of being dispersed in finely divided condition, and an admixed agent capable of reducing flame temperature.

5. The method of signaling, which comprises detonating a composition of nitrated starch and a non-explosive coloring substance.

WALTER O. SNELLING.